United States Patent [19]

Stewart et al.

[11] 4,330,882

[45] May 18, 1982

[54] APPARATUS FOR MONITORING A WIDEBAND ELECTROMECHANICAL RECORDING SYSTEM

[75] Inventors: Wilber C. Stewart, Hightstown; Gerard A. Alphonse, Princeton, both of N.J.

[73] Assignee: RCA Corporation, New York, N.Y.

[21] Appl. No.: 154,765

[22] Filed: May 30, 1980

[51] Int. Cl.³ ............................................. G11B 27/36
[52] U.S. Cl. ..................................... 369/55; 310/316; 369/133
[58] Field of Search ................... 369/14, 16, 50, 51, 369/55, 88, 132, 133, 134; 310/316, 326; 358/128.5

[56] References Cited

U.S. PATENT DOCUMENTS

| | | | |
|---|---|---|---|
| 3,842,194 | 10/1974 | Clemens | 369/54 |
| 3,872,498 | 3/1975 | Pritchard | 358/21 |
| 4,044,379 | 8/1977 | Halter | 358/128.5 |
| 4,060,831 | 11/1977 | Halter | 369/16 |
| 4,223,242 | 9/1980 | Redlich et al. | 310/316 |
| 4,295,216 | 10/1981 | Truesdell et al. | 369/55 |

Primary Examiner—Bernard Konick
Assistant Examiner—Donald McElheny, Jr.
Attorney, Agent, or Firm—E. M. Whitacre; J. S. Tripoli; J. E. Roehling

[57] ABSTRACT

Piezoelectric video disc recording cutterheads have small and intricate geometries that make it difficult to compute or measure their mechanical characteristics, especially during the recording process. A monitoring circuit, for use during recording, for monitoring and measuring the mechanical characteristics of a recording cutterhead takes the form of a bridge network. The motional charge or motional current, which are related to the mechanical characteristics of the cutterhead, is measured by means of the bridge network. One branch of the bridge is arranged to include the piezoelectric cutterhead, the other branch comprises a variable capacitor which is adjusted to compensate for the shunt capacitance of the equivalent electrical circuit of the cutterhead. When the variable capacitance is properly adjusted the combination of the currents through the bridge network provides a signal representative of the displacement characteristics of the cutterhead.

7 Claims, 4 Drawing Figures

APPARATUS FOR MONITORING A WIDEBAND ELECTROMECHANICAL RECORDING SYSTEM

The present invention relates generally to an electromechanical recording system and more particularly to apparatus for monitoring a response and measuring parameters (e.g., stylus displacement) of a piezoelectrically driven cutterhead during the electromechanical recording of a disc substrate.

BACKGROUND OF THE INVENTION

In certain video disc systems, information is stored on a disc record in the form of geometric variations in a continuous spiral information track (e.g., a groove) disposed on the record surface. Variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In one format for the information track in practice of the Clemen's invention, depressed areas extending across the groove alternate with non-depressed areas, where the frequency of alternation varies with the amplitude of video information subject to recording. The form of the recorded signals may be, thus, a carrier whose frequency is modulated over a frequency deviation range in representation of video information. Certain practical considerations in the recording and playback processes have led to the location of the frequency deviation range at 4.3 to 6.3 MHz, and to the limitation of baseband video information to 3 MHz, for example. With this choice of parameters, the highest significant frequency component of the recorded signal is located at 9.3 MHz (e.g., 6.3+3.0 MHz).

In one electromechanical recording system described in U.S. Pat. No. 4,060,831 issued to J. B. Halter on Nov. 29, 1977, the cutterhead used to record the groove and signal information into a copper disc master or substrate is constructed such that its principle resonant frequency is established at a frequency in the midst of the frequency band where most of the energy of the encoded video signal components occurs. In this Halter system an equalizer network whose frequency response characteristic is complementary to the frequency response characteristic of the cutterhead is interposed between the signal source and the piezoelectric element of the cutterhead. The equalizer network serves two purposes. On the one hand, it cooperates with the cutterhead response characteristics to provide a frequency response characteristic which is relatively flat over the bandwidth occupied by the components of the encoded video signal. On the other hand, it serves to attenuate the energy level of signal components lying in the region where most of the energy of the encoded video signal occurs, thereby protecting the cutterhead from application of excessive electric fields. The attenuation of the applied energy makes possible the use of a smaller cutterhead than would otherwise be the case. The small cutterhead structure, in turn, results in a relatively wide cutterhead bandwidth.

The compensation necessary to provide a cutterhead which is flat over the bandwidth of the recording signal which, according to the Clemens patent, is up to 9.3 MHz may not be the same for cutterheads made under the same nominal conditions. Variations from device to device necessitate the matching of a given equalizer network to a given cutterhead. Therefore, a specialized equalizer must be provided for each particular cutterhead to effect a flat response. In the past the characteristics of a cutterhead have been ascertained by recording into a disc master and then measuring the groove and signal depth. This technique is undesirable since recording followed by measuring is a difficult and laborious process which may take hours to complete.

SUMMARY OF THE INVENTION

Consequently, it is highly desirable to be able to measure the characteristics of cutterheads in general and the displacement of cutterheads during the recording process in particular. A knowledge of cutterhead parameters facilitates the design of the equalizer network. The ability to monitor cutterhead displacement, especially during the recording process, permits one to adjust the equalizer to optimize the response for the appropriate bandpass characteristics. Also, by monitoring cutterhead displacement the driving voltage which is applied to the cutterhead may be set to a level suitable for a desired displacement.

In accordance with the principles of the present invention, an apparatus is provided for measuring the characteristics of a cutterhead to facilitate the design of an appropriate equalizer network.

Further, in accordance with the principles of the present invention an apparatus is provided for monitoring the mechanical characteristics (e.g., displacement, both in magnitude and phase) of an electromechanical cutterhead during the recording process.

BRIEF DESCRIPTION OF THE DRAWING

Other features and advantages of the invention will be more fully understood from the following detailed description of the preferred embodiment, the appended claims and the accompanying drawing in which:

DESCRIPTION OF THE PREFERRED EMBODIMENT

Figure 1:
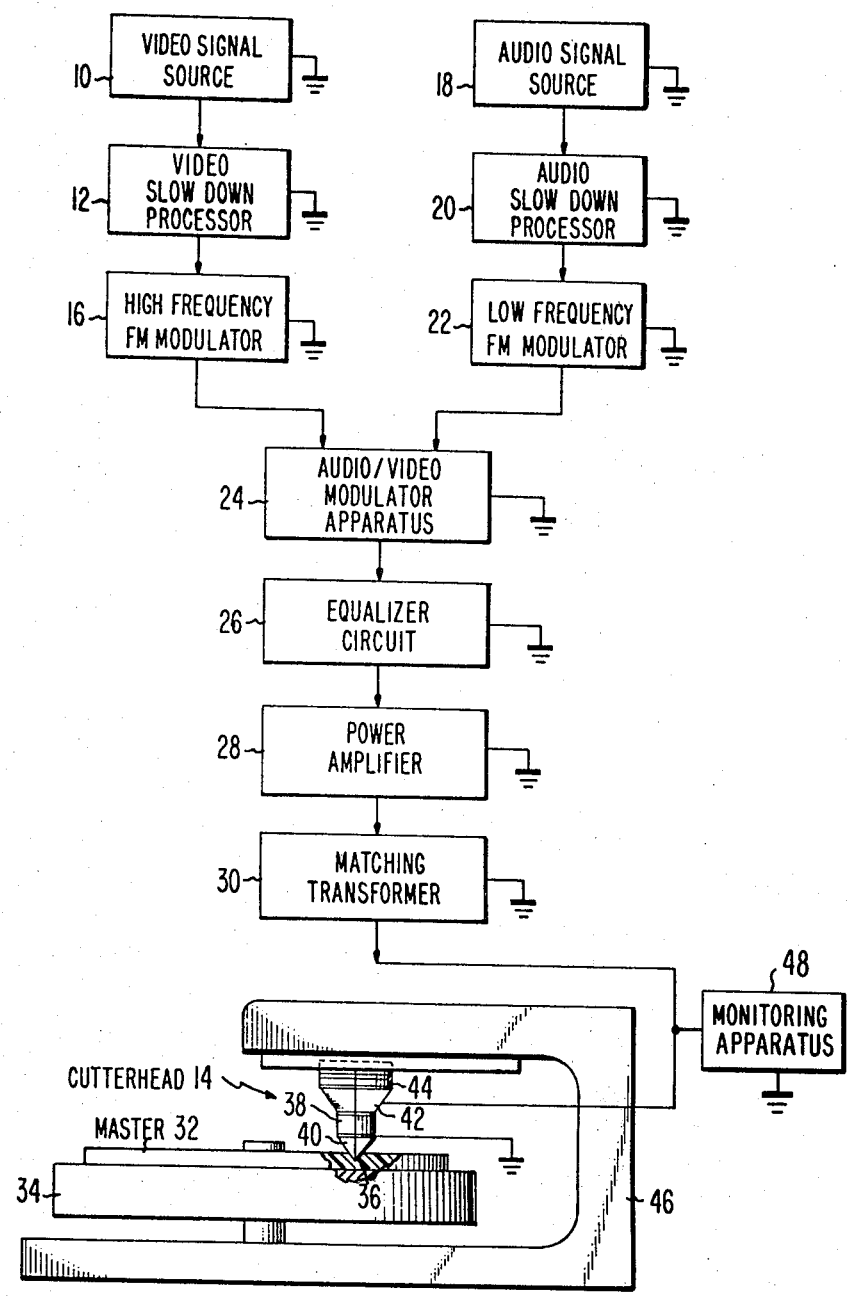
FIG. 1 illustrates, partially in a block diagram form, an electromechanical recording system.

In the electromechanical recording system of FIG. 1, a video signal source 10 supplies a composite video signal, inclusive of luminance information and encoded chrominance information representative of a succession of scanned colored images to be recorded. to a video slow-down processor 12. The composite color video signal supplied by the source may advantageously be in the "buried color subcarrier" format disclosed in the U.S. Pat. No. 3,872,498, issued to D. H. Pritchard, and entitled, "COLOR INFORMATION TRANSLATING SYSTEMS."

The video slow-down processor 12 slows down the output signal of the video signal source 10. In this particular embodiment, the output signal of the video signal source is slowed down by a factor of two (i.e., slowed down video signal extending to 1.5 MHz).

A high frequency FM modulator 16 is coupled to the output of the video slow-down processor 12. The FM modulator 16, incorporating a suitable source of high frequency oscillations, functions to develop at its output terminal a frequency modulated picture carrier signal, the instantaneous frequency thereof varying over a predetermined high frequency deviation range (e.g., 4.3/2 MHz to 6.3/2 MHz) in accordance with the amplitude of the slowed-down composite video signal (e.g., extending to 1.5 MHz) supplied by the source 10. It should be noted that, with this choice of parameters, the highest significant frequency component of the signal developed at the output of the FM modulator 16 is located at 4.65 MHz (i.e., 3.15+1.50 MHz).

The electromechanical recording system of FIG. 1 further includes an audio signal source 18, which supplies an audio signal, representative of a desired sound accompaniment for the colored images being recorded, to an audio slow-down processor 20. The audio slow-down processor 20 likewise slows down the output signal of the audio signal source 18 (e.g., by a factor of two) in order to correlate the audio signal to be recorded with the slow-down video signal.

A low frequency FM modulator 22, coupled to the output of the audio slow-down processor 20, frequency modulates a slowed-down low frequency carrier over a low frequency deviation range (e.g., 716/2±25 KHz) in accordance with the amplitude of the slowed-down audio signal (e.g., extending to 10 KHz) supplied by the audio slow-down processor.

The outputs of the high frequency FM modulator 16 and the low frequency FM modulator 22 are supplied to a modulator apparatus 24. The modulator apparatus 24 combines the outputs of the two FM modulators and supplies the combined signal to an equalizer circuit 26. The equalizer circuit 26 functions to selectively reduce the energy levels of the signal components developed at the output of the modulator apparatus. The output of the equalizer circuit is applied to a cutterhead 14 via a power amplifier 28 and a matching transformer 30. Coupled to the input of cutterhead 14 is a monitoring apparatus 48 for monitoring the mechanical displacement of cutterhead 14. A more detailed description of the monitoring apparatus 48 will be provided herein.

The cutterhead 14, responsive to a relatively high frequency signal at the output of the matching transformer 30 (e.g., the highest frequency signal component occurring at 4.65 MHz) records the signal components in a disc master 32 rotatably supported by a turntable 34. The disc master 32 is rotated at a slowed-down recording speed (e.g., 450/2 rpm) while the cutterhead 14 is translated radially across the disc master by carriage 44 which is movably supported on a frame 46 in correlation with the rotational motion of the disc master, so as to record information along a spiral track 36 on the disc master.

It is noted that when the signal in the aforementioned format is recorded in real time, the video and audio slow-down processors 12 and 20 would be eliminated, the high frequency FM carrier deviation range would be located at 4.3 to 6.3 MHz, the low frequency FM carrier deviation range would be located at 716±50 KHz and the turntable would be rotated at 450 rpm.

Several alternative modes of operation of the modulator apparatus 24 are feasible. In accordance with one mode of operation of the modulator apparatus 24, which may take the form of a linear adder, the once modulated sound signal is added to the once modulated video signal. The combination signal waveform which appears at the output terminal of modulator apparatus 24 is that of picture carrier waves with successive cycles swinging about an average value that undulates in sinusoidal fashion about zero at the sound carrier rate. Reference may be made to U.S. Pat. No. 4,044,379 for J. B. Halter, entitled "Method and Apparatus for Electromechanical Recording of Short Wavelength Modulation in a Metal Master," for a description of this superposition approach to modulation.

Figure 2:
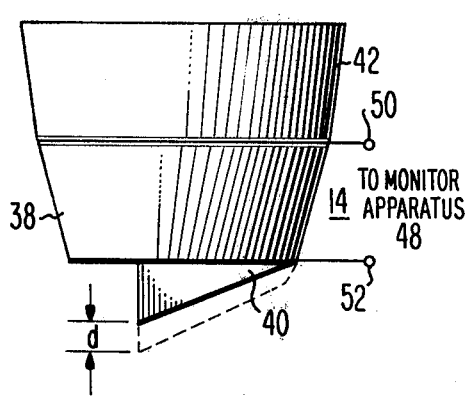
FIG. 2 illustrates an elevation view of a cutterhead suitable for use with the system of FIG. 1.

Referring to FIG. 2, the cutterhead 14 comprises a piezoelectric element 38 (illustratively formed of PZT8 (trademark) material interposed between a stylus 40 (illustratively formed of diamond) and pedestal 42 (illustratively formed of steel). Electrodes 50 and 52 are coupled to the upper and lower surfaces of piezoelectric element 38 respectively. A video signal applied to electrodes 50 and 52 effects a motion of the piezoelectric element 38 which, in turn, effects a displacement "d" of stylus 40. The displacement "d" is recorded on rotating copper master 32 as a modulation of the depth of the groove which is cut into the master 32 by stylus 40.

Figure 3:
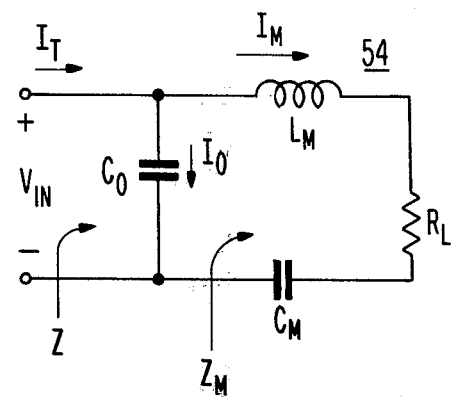
FIG. 3 is an equivalent circuit model of a piezoelectric cutterhead of the type illustrated in FIG. 2.

Referring to FIG. 3 an all electrical equivalent circuit 54 of the device of FIG. 2 is illustrated. Over the frequency range of interest (i.e., DC to 1.2 $f_s$ where $f_s$ is the first significant resonant frequency of cutterhead 14), the equivalent circuit may be represented by series resonant circuit $L_M$, $R_L$, $C_M$ shunted by capacitor $C_O$. The mechanical parameters associated with cutterhead 14 may be derived by measuring the electrical charge, i.e., "mechanical" current which flows through the piezoelectric element 38. For example, the charge $Q_M$ on capacitor $C_M$ is related to the mechanical displacement d where $d=KQ_M$. $Q_M$ which is equal to $\int I_M dt$ may be obtained by subtacting the current $I_O$ through capacitor $C_O$ (current $I_O$ does not contribute to mechanical displacement) from the total current $I_T$ through cutterhead 14 to provide the mechanical current $I_M$. The impedance $Z_M$ which is proportional to mechanical impedance is equal to the voltage $V_{in}$ divided by the current $I_M$, and, the cutting force $F_L$ which is applied to stylus 40 is proportional to the product of the resistance $R_L$ and the current $I_M$. Thus, it can be seen that all of the mechanical parameters of the cutterhead 14, i.e., displacement, mechanical impedance and cutting force, may be obtained by measuring the current $I_M$ or charge $Q_M$ as a function of the frequency.

Figure 4:
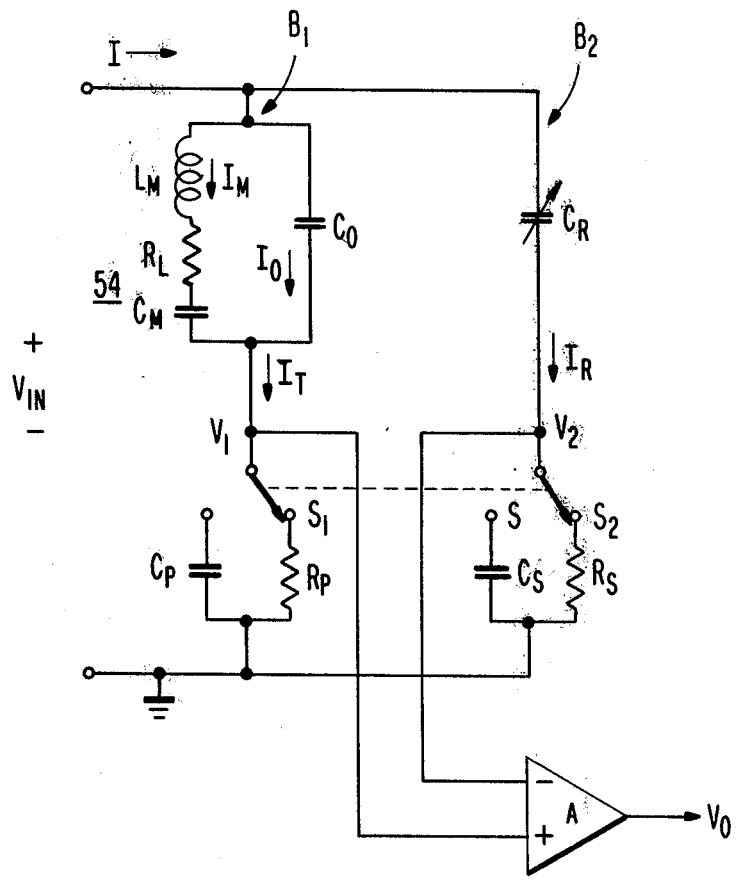
FIG. 4 illustrates a circuit schematic of a monitoring apparatus constructed in accordance with the principles of the present invention.

A circuit schematic of a basic monitoring circuit pursuant to the principles of the present invention is illustrated in FIG. 4. The basic monitoring circuit of FIG. 4 comprises two branches $B_1$ and $B_2$ across which the voltage $V_{in}$, which is used to drive the cutterhead, is applied. Branch $B_1$ includes the cutterhead equivalent circuit 54 which is illustrated in FIG. 3. A variable capacitor $C_R$ is connected into branch $B_2$. Resistor $R_P$ or capacitor $C_P$ may be connected via switch $S_1$ to equivalent circuit 54 to complete a series loop of branch $B_1$. Similarly, branch $B_2$ may be completed by connecting resistor $R_S$ which is identical to resistor $R_P$ or capacitor $C_S$ which is identical to capacitor $C_P$ via switch $S_2$ to variable capacitor $C_R$. The voltage $V_1$ across resistor $R_P$ or capacitor $C_P$ and the voltage $V_2$ across resistor $R_S$ or capacitor $C_S$ are coupled to the inputs of differential amplifier A. An output voltage $V_O$ from amplifier A is equal to $\alpha(V_1-V_2)$ where $\alpha$ is the gain of amplifier A.

In operation the total current I is divided between the two branch currents $I_T$ and $I_R$ where $I_T$ is the total cutterhead current and $I_R$ is the current through variable capacitor $C_R$. The cutterhead current $I_T$ is further divided into the capacitor current $I_O$ and the mechanical current $I_M$. The current $I_M$ or its integral, $Q_M$, is the parameter related to the mechanical characteristics of the cutterhead which is to be measured. Since neither of these electrical parameters is accessible directly—only $I_T$ or its integral through the piezoelectric element can be measured directly—measurement must be effected by some indirect technique.

To measure $I_M$, switches $S_1$ and $S_2$ are arranged to couple resistors $R_P$ and $R_S$ into the branch networks. In this configuration the output voltage of differential amplifier A is:

$$V_O = \alpha(V_1 - V_2) = \alpha R_P(I_T - I_R) \tag{1}$$

If $R_P$ and $R_S$ are chosen to be much smaller than the reactance of adjustable capacitor $C_R$ or the impedance of circuit (i.e., cutterhead) 54 then the voltages $V_1$ and $V_2$ are essentially at ground potential. Further, if variable capacitance $C_R$ is adjusted such that $C_R$ equals $C_O$, then $I_R$ equals $I_O$ and the output voltage of differential amplifier A may be represented by:

$$V_O = \alpha R_P I_M. \tag{2}$$

In other words, the mechanical current $I_M$ is proportional to the output voltage $V_O$. Of course, if the values of $R_P$ and $\alpha$ are known, the equivalent mechanical current $I_M$ may be determined directly from equation 2. By connecting $V_O$ to one channel of a Hewlett Packard network analyzer (i.e., HP 8407) and $V_{in}$ to the other, the impedance $Z_M$ (both magnitude and phase) may be obtained. By sweeping $V_{in}$ over the frequency range of interest the frequency response of $Z_M$ or $I_M$ (both magnitude and phase) may be obtained.

To measure the charge $Q_M$ or the displacement d of cutterhead 14, switches $S_1$ and $S_2$ are arranged to couple capacitors $C_P$ and $C_S$ into the branch networks. By so arranging $S_1$ and $S_2$ the voltage $V_1$ becomes equal to $1/C_P \int I_T dt$ and $V_2$ become equal to $1/C_P \int I_R dt$. Therefore, $V_O$ may be represented by:

$$V_O = \alpha/C_P \int (I_T - I_R) dt \tag{3}$$

When $C_R$ is set equal to $C_O$ so that $I_O = I_R$ the output voltage of differential amplifier A may be expressed by:

$$V_O = \alpha/C_P \int I_M dt = \alpha/C_P [Q_M] \tag{4}$$

Thus, the displacement of cutterhead 14 may be represented by:

$$d = [C_P/\alpha K] V_O.$$

In other words, the displacement d is proportional to the output voltage $V_O$.

By sweeping $V_{in}$ over the frequency range of interest the frequency response of $Q_M$ (both magnitude and phase) or the displacement d may be measured.

In order to measure the mechanical current $I_M$ or mechanical charge $Q_M$ the value of capacitor $C_R$ must be set substantially equal to the shunt capacitance $C_O$. Since $C_O$ cannot be isolated and measured directly it must be measured by some indirect technique. Referring to FIG. 3, let $Q_M$ be the charge across $C_m$ due to current $I_M$ through the series resonant circuit $L_M$, $R_L$, and $C_M$. From circuit analysis the charge $Q_M$ may be expressed by:

$$Q_M = \frac{Q \cdot C_M V_{in}}{\left[Q^2\left(1 - \left(\frac{\omega}{\omega_s}\right)^2\right)^2 + \left(\frac{\omega}{\omega_s}\right)^2\right]^{\frac{1}{2}}} \tag{5}$$

where $\omega$ is the angular frequency at resonance $$\omega_s^2 = \frac{1}{L_M C_M} \text{ and } Q = \frac{\omega_s L_M}{R_L}.$$

When equation 5 is reduced, it turns out that $Q_M(\omega_s) = Q C_M V_{in}$ at resonance (i.e., where $\omega = \omega_s$) and that $Q_M(low) = C_M V_{in}$ at low frequencies (i.e., where $\omega << \omega_s$), therefore, the ratio of $Q_M(\omega_s)$ to $Q_M(low)$ is equal to Q. Q is approximately equal to $f_s$ (i.e., resonant frequency of the cutterhead) divided by $\Delta f$ (i.e., the 3 dB bandwidth of the cutterhead response). Since the output voltage of the differential amplifier A is proportional to the charge $Q_M$, the ratio of output voltages may be expressed as:

$$\frac{V_o(\omega_s)}{V_o(low)} = Q \tag{6}$$

It should be noted that equation (6) is rigorous only when $C_R = C_O$, however, it has been found that the value of $C_R$, and thus $C_O$, can be determined with reasonable accuracy, by this technique.

The procedure for setting $C_R$ (i.e., determining the value of $C_O$) can now be explained. The output voltage $V_O$ at resonance and the Q are measured on an oscilloscope display. With these two parameters capacitor $C_R$ may be adjusted while monitoring the oscilloscope display of the cutterhead displacement (i.e., the output voltage $V_O$ of amplifier A). When $V_O$ (low) is equal to $V_O(\omega_s)$ divided by Q the value of $C_R$ should be substantially equal to $C_O$.

While the principles of the present invention have been demonstrated with particular regard to the illustrative structures of FIGS. 1-4, it will be recognized by those of skill in the art that various departures from such illustrative structures may be undertaken in practice of the invention. For example, the monitoring apparatus of FIG. 4 may be provided by a transformer circuit as illustrated in a concurrently filed application entitled "Apparatus for Measuring the Characteristics of a Wideband Electromechanical Recording System Having a Transformer" for R. L. Truesdell et al.

What is claimed is:

1. A monitoring apparatus for measuring the displacement of a wideband electromechanical cutterhead in a system for recording signals in a disc master; the frequency spectrum of said signals having a region of relatively high energy level, said system including a source for supplying said signals, said cutterhead being responsive to said signals for recording representations of said signals in said disc master when relative motion is established therebetween; means for applying said signals to said cutterhead to cause the cutterhead to undergo vibrations in response to said signals; said apparatus comprising:

a first signal branch connected between said source of signals and a point of reference potential which includes said cutterhead; said cutterhead having an electrical equivalent circuit which is substantially represented by a series resonant circuit in shunt with a capacitive element; the signal which flows through said series resonant circuit being representative of the mechanical characteristics of said cutterhead;

a second signal branch, connected in parallel with said first signal branch between said source of signals and said point of reference potential, having a variable circuit element included therein; and a differential amplifier, said first signal branch coupled to a first input terminal of said differential amplifier and said second signal coupled to another input of said differential amplifier, for differentially combining the signal from said first signal branch with the signal from said second signal branch; the signal output from said differential amplifier being a substantial representation of the signal which flows through said series resonant circuit.

2. The apparatus according to claim 1 wherein said variable circuit element comprises a variable capacitor and wherein the capacitance value of said variable capacitor is set to be substantially equal to the capacitance value of said shunt capacitive element.

3. A monitoring apparatus for measuring the displacement of a wideband electromechanical cutterhead in a system for recording signals in a disc master; the frequency spectrum of said signals having a region of relatively high energy level, said system including a source for supplying said signals; said cutterhead being responsive to said signals for recording representations of said signals in said disc master when relative motion is established therebetween; and means for applying said signals to said cutterhead to cause the cutterhead to undergo vibrations in response to said signals; said apparatus comprising:

a first signal branch connected between said source of signals and a point of reference potential and including said cutterhead and a first switch, connected in first series arrangement, said cutterhead being represented by a series resonant circuit shunted by a reactive element;

a first resistive element and a first reactive element coupled in said first signal branch such that said first switch selectively connects either said first resistive element or said first reactive element in series with said first series arrangement;

a second signal branch connected between said source of signals and said point of reference potential and including a variable reactive element and a second switch connected in second series arrangement;

a second resistive element and a second reactive element coupled in said second signal branch such that said second switch selectively connects either said second resistive element or said second reactive element in series with said second series arrangement;

differential amplifier means, coupled to said first signal branch and said second signal branch, for providing an electrical signal output which is a substantial representation of the mechanical characteristics of said cutterhead;

said variable reactive element being adjusted to compensate for the shunt reactive element of the cutterhead such that said electrical signal output from said differential amplifier means is substantially representative of a first mechanical characteristic of said cutterhead when said first and second switches connect said first resistive element in series with said first series arrangement and said second resistive element in series with said second series arrangement respectively and of a second mechanical characteristic of said cutterhead when said first and second switches connect said first reactive element in series with said first series arrangement and said second reactive element in series with said second series arrangement respectively.

4. The apparatus according to claim 3 wherein said cutterhead has an electrical equivalent circuit which is substantially represented by a series resonant circuit in shunt with a capacitor.

5. The apparatus according to claim 4 wherein said variable reactive element comprises a variable capacitor and wherein the capacitance value of said variable capacitor is set substantially equal to the capacitance value of said shunt capacitor.

6. The apparatus according to claim 5 wherein the resistance value of said first resistive element is substantially equal to the resistance value of said second resistive element, wherein said first and second reactive elements are capacitors and wherein the capacitance value of said first reactive element is substantially equal to the capacitance value of said second reactive element.

7. The apparatus according to claim 6 wherein the impedance of said resistive elements and the impedance of said reactive elements are substantially less than the impedance of said variable capacitor.

* * * * *

UNITED STATES PATENT AND TRADEMARK OFFICE
CERTIFICATE OF CORRECTION

PATENT NO. : 4,330,882
DATED : May 18, 1982
INVENTOR(S) : Wilber C. Stewart; Gerard A. Alphonse It is certified that error appears in the above—identified patent and that said Letters Patent is hereby corrected as shown below:

Column 1, line 60 - delete "small" and insert

---smaller---.

IN CLAIM 1:

Column 7, line 12 - insert "branch" before coupled to another input...............

Signed and Sealed this

Twentieth Day of July 1982

[SEAL]

Attest:

Attesting Officer

GERALD J. MOSSINGHOFF

Commissioner of Patents and Trademarks